United States Patent [19]
deBlois et al.

[11] Patent Number: 5,647,091
[45] Date of Patent: Jul. 15, 1997

[54] ANIMAL GROOMING VACUUM CLEANER

[75] Inventors: Bryan P. deBlois, Guilford; Bernard L. Bensussen, Seymour, both of Conn.

[73] Assignee: Black & Decker Inc., Newark, Del.

[21] Appl. No.: 571,480

[22] Filed: Dec. 13, 1995

[51] Int. Cl.$^6$ .................................................. A47L 5/00
[52] U.S. Cl. ........................... 15/323; 15/325; 15/327.6; 15/402
[58] Field of Search ................... 15/323, 325, 327.1, 15/327.2, 327.6, 402, 412; 43/139; 119/609, 652, 664

[56] References Cited

U.S. PATENT DOCUMENTS

| | | |
|---|---|---|
| 1,770,749 | 7/1930 | Engberg et al. . |
| 3,145,691 | 8/1964 | Yates . |
| 3,668,736 | 6/1972 | Loscalzo . |
| 4,279,095 | 7/1981 | Aasen . |
| 4,485,583 | 12/1984 | Planty . |
| 4,630,329 | 12/1986 | Shores . |
| 4,729,147 | 3/1988 | Armbruster . |
| 4,799,460 | 1/1989 | Kuhl . |
| 4,947,799 | 8/1990 | Parker . |
| 5,067,444 | 11/1991 | Parker . |
| 5,074,006 | 12/1991 | Eremita . |
| 5,211,131 | 5/1993 | Plyler . |
| 5,231,762 | 8/1993 | Hunts . |

Primary Examiner—David Scherbel
Assistant Examiner—Terrence Till
Attorney, Agent, or Firm—Barry E. Deutsch

[57] ABSTRACT

A vacuum apparatus having a housing, a vacuum generating system, and a hose. The housing has a small height and a general circular disk shape. A side perimeter of the housing has a hose receiving area that extends around a majority of the housing. The hose is located in the hose receiving area to both house the hose and use the hose as a bumper for the apparatus. The apparatus is configured to provide a maximum vacuuming pressure of only about 10 to 12 inches of water such that animals can be groomed without harming the animals. The vacuum generating system has a variable speed motor such that the motor speed can be adjusted by a user dependent upon the size or type of animal being groomed. The vacuum apparatus also has a noise reduction system including a muffler, an impeller with long fan blades, and multiple air flow path redirections of air traveling through the housing.

7 Claims, 5 Drawing Sheets

ANIMAL GROOMING VACUUM CLEANER

BACKGROUND OF THE INVENTION

1. Field of the Invention

The present invention relates to vacuum cleaners and, more particularly, to an animal grooming apparatus.

2. Prior Art

There are numerous types of vacuuming devices known in the prior art. There are also numerous animal grooming devices which relate to the use of a vacuum with such devices. Some of these devices are described in the following U.S. Patents:

| | |
| --- | --- |
| U.S. Pat. No. 1,770,749 | U.S. Pat. No. 3,145,691 |
| U.S. Pat. No. 3,668,736 | U.S. Pat. No. 4,279,095 |
| U.S. Pat. No. 4,485,583 | U.S. Pat. No. 4,729,147 |
| U.S. Pat. No. 4,630,329 | U.S. Pat. No. 4,799,460 |
| U.S. Pat. No. 4,947,799 | U.S. Pat. No. 5,067,444 |
| U.S. Pat. No. 5,074,006 | U.S. Pat. No. 5,231,762 |
| U.S. Pat. No. 5,211,131 | |

SUMMARY OF THE INVENTION

In accordance with one embodiment of the present invention, an animal grooming vacuum apparatus is provided comprising a housing, a vacuum generating system, and a hose. The vacuum generating system is located in the housing and includes a motor and an impeller. The hose is connected to the housing. The vacuum generating system, housing and hose are suitably configured to provide a maximum vacuuming pressure at an inlet of the hose of only about 10 to 12 inches of water such that animals can be groomed without harming the animals.

In accordance with another embodiment of the present invention, a vacuum apparatus is provided comprising a housing, a motor, an impeller, and a noise reduction system. The noise reduction system is provided to dampen noise from the motor and movement of air through the housing. The noise reduction system includes a block of sound dampening material surrounding the motor and the impeller, and an air flow path from the impeller to an air exit of the housing having at least five flow path redirections of at least 90° each.

In accordance with another embodiment of the present invention, in a vacuum apparatus having a housing, a motor, an impeller, and a vacuum hose, the improvement comprises the housing having a hose receiving area around a majority of a side perimeter of the housing in which the hose is located. The hose extends partially out of the hose receiving area along substantially its entire length to form a bumper for the housing.

In accordance with another embodiment of the present invention, in a vacuum apparatus having a housing, a motor, an impeller, and a motor control, the improvement comprises the motor control having a variable motor speed controller that allows a user to vary the speed of the motor between a high speed and a low speed and thereby vary the air flow velocity being drawn by the vacuum apparatus.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
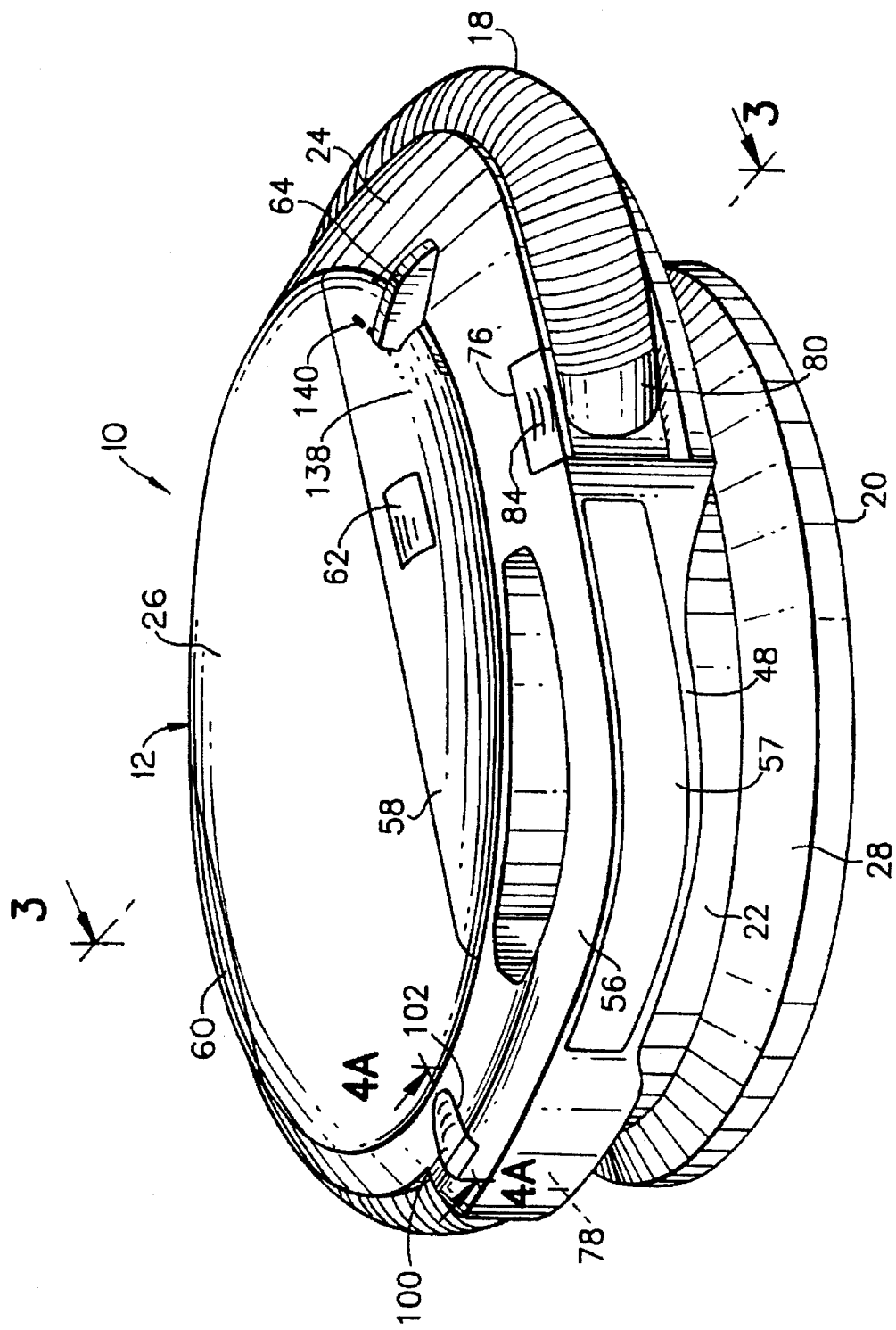
FIG. 1 is a perspective view of a vacuum apparatus incorporating features of the present invention.

Referring to FIG. 1, there is shown a perspective view of a vacuum apparatus 10 incorporating features of the present invention. Although the present invention will be described with reference to the embodiments shown in the drawings, it should be understood that the present invention may be incorporated into various different alternative embodiments. In addition, any suitable size, shape or type of elements or materials could be used.

Figure 2:
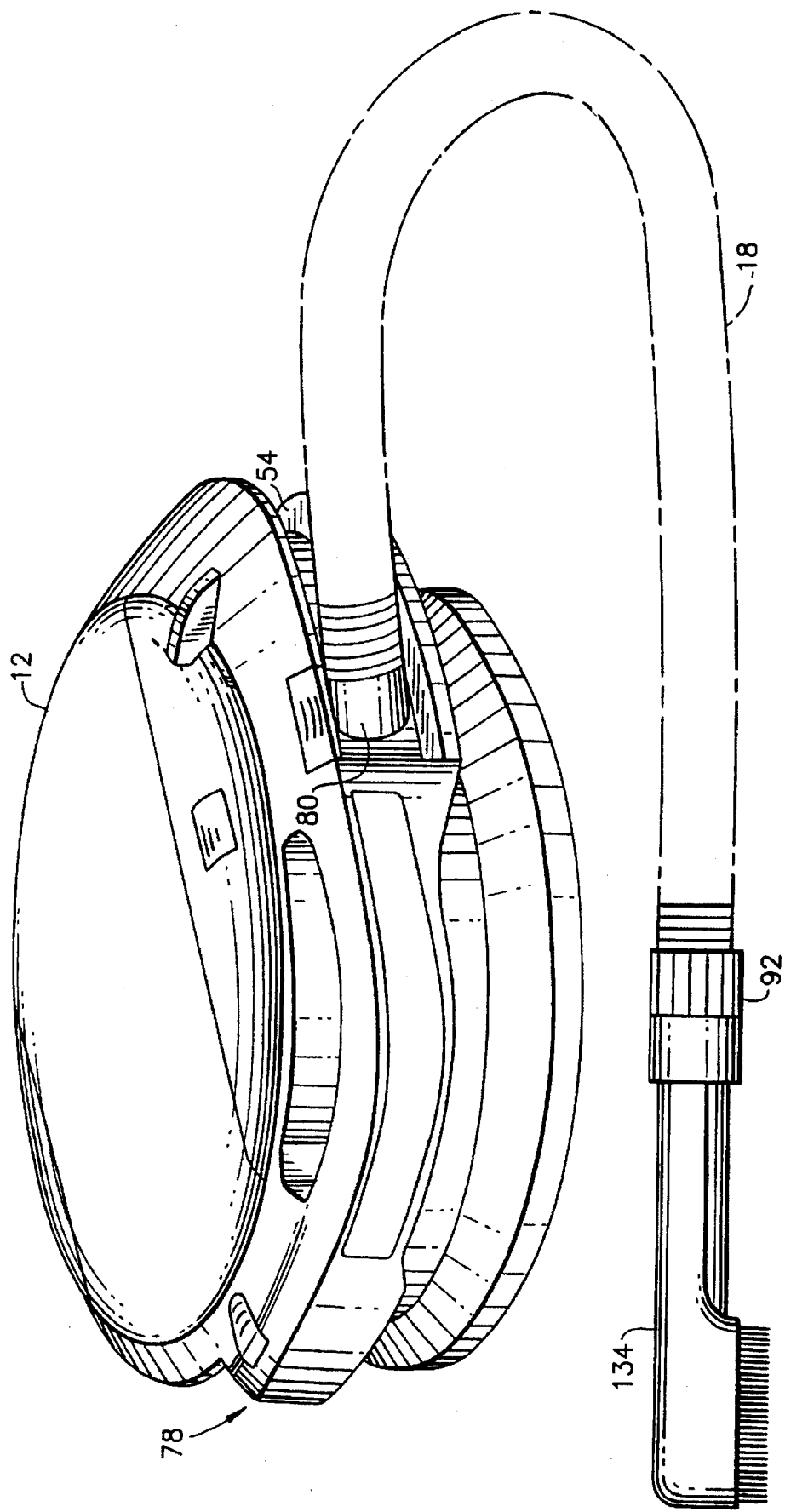
FIG. 2 is a perspective view of the apparatus shown in FIG. 1 with its hose removed from its storage position and having an attachment connected to the free end of the hose.
Figure 3:
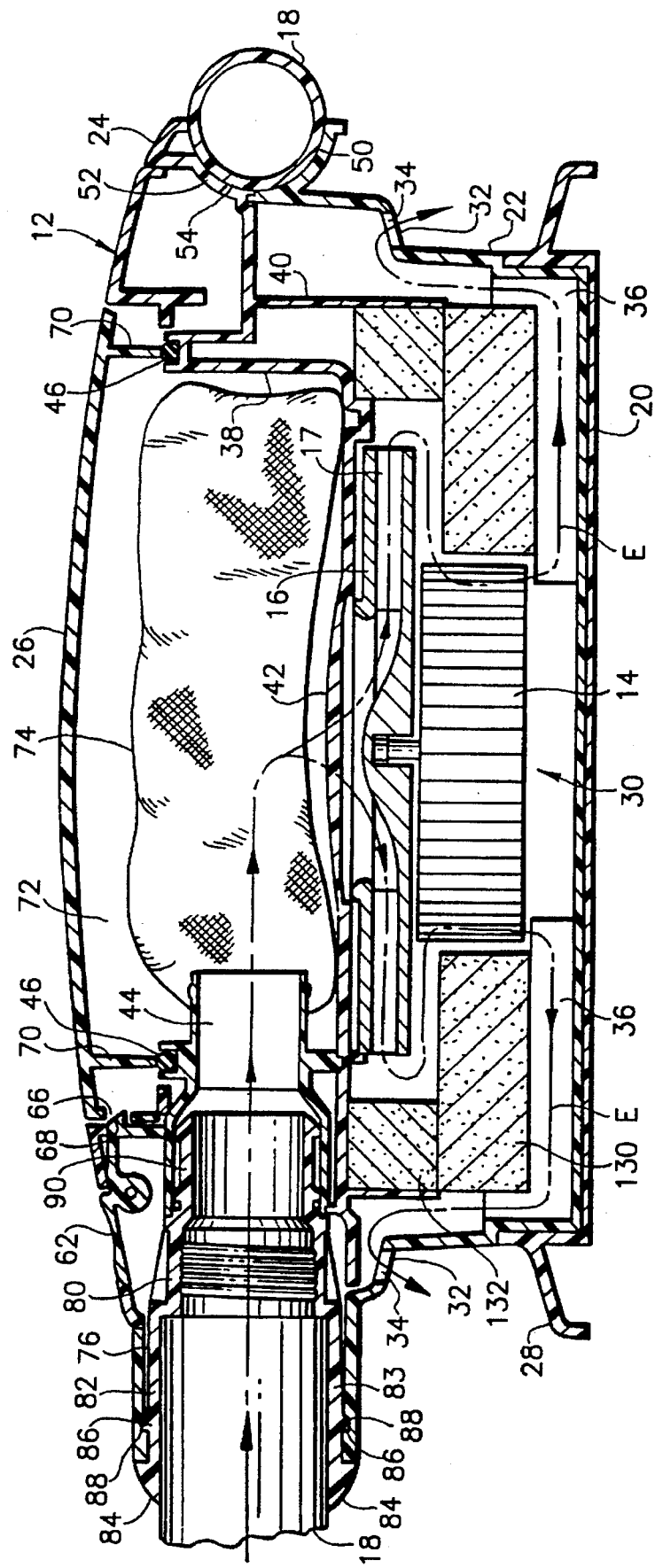
FIG. 3 is a cross sectional view of the apparatus shown in FIG. 1 taken along line 3—3.

Referring also to FIGS. 2 and 3, the apparatus 10 generally comprises a housing 12, a vacuum generating system having a motor 14 and an impeller 16, and a hose 18. The housing 12 has a general circular disk shape with a base 20, a lower housing member 22, an upper housing member 24, and a movable lid 26. In a preferred embodiment the housing is made of plastic. The base 20 is suitably shaped to be placed on a table top or floor. The base 20 is fixedly attached to the bottom of the lower housing member 22. The base 20 includes a perimeter skirt 28 that extends around the entire apparatus. The skirt 28 has a downwardly and outwardly sloped top surface.

Figure 3A:
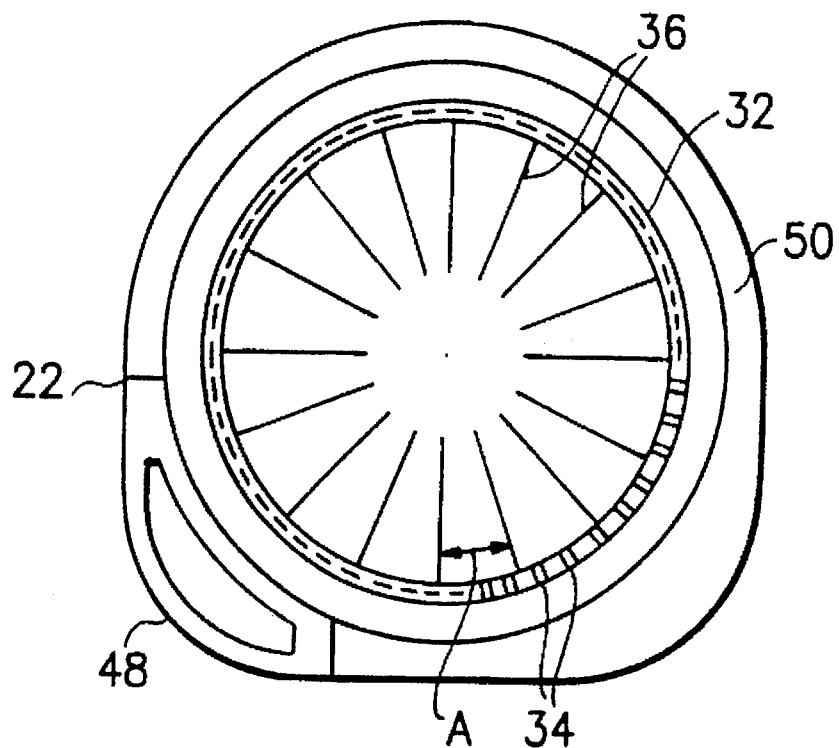
FIG. 3A is a schematic plan top view of the lower housing member shown in FIG. 3.

The lower housing member 22 has a main receiving area 30 for receiving the motor 14 and the impeller 16. The lower housing member 22 has air path directing walls 36 located at the bottom of the receiving area 30. The perimeter side wall of the lower housing 22 has an outward step 32 with a plurality of holes 34 therethrough. The holes 34 extend around substantially the entire side perimeter of the apparatus 10. Referring also to FIG. 3A, a schematic plan top view of the lower housing member 22 is shown. The walls 36 extend radially outwardly from the center of the lower housing member 22. Thus, the distance or area A between adjacent walls 36 increases further from the center. Located in one corner is a handle section 48. Extending around the rest of the lower housing member 22 is an upwardly facing curved ledge 50.

Referring particularly to FIG. 3, the upper housing member 24 is fixedly attached to the lower housing member 22. The upper housing member 24 includes a center basket section 38 and a downward extending circular wall 40. The center basket section 38 has a middle section 42 with multiple apertures therethrough. In an alternate embodiment the middle section 42 could be replaced by a screen or mesh member attached to the basket section 38. Mounted through the side wall of the basket section 38, on one side, is a bag and hose coupling 44. The top of the basket section 38 and the top of the coupling 44 have channels that hold a seal 46 for the lid 26. The upper housing member 24 has a downwardly facing curved ledge 52. The ledge 52 is in registry with the ledge 50 of the lower housing member 22 to form a hose receiving area 54 (see FIG. 2). The hose receiving area 54 extends along about 75% of the circumference or side perimeter of the housing 12. One corner of the upper housing member 24 also has a handle section 56 (see FIG. 1) that mates with the handle section 48 of the lower housing member 22 to form a handle 57 for the apparatus 10.

Stationarily connected to the upper housing member 24 are a front cover 58 and a hinge support 60. The front cover 58 has a spring loaded lid release button 62 mounted to it. A motor speed control is located under the front cover 58 and includes a slidable controller actuator 64. The lid 26 is movably attached to the hinge support 60 by a hinge (not shown). The front of the lid 26 has a notch 66. The button 62 has a latch 68. As seen in FIG. 3, with the lid 26 in a closed position and the button 62 not depressed, the latch 68 is located in the notch 66 to retain the lid 26 at its closed position. When the button 62 is depressed by a user, the latch 68 moves out of the notch 66. This allows the lid 26 to move from its closed position. Releasing the button 62 and moving the lid 26 back to its closed position results in the latch snap-locking into the notch 66 again. The lid 26 also has a downward extending wall 70. The wall 70 makes contact with the seal 46 to enclose the top of the basket 38. This forms an area 72 in which a collection bag 74 is located. The lid 26 can be opened to empty or replace the bag 74.

The lower and upper housing members 22,24 also form two receiving areas in the side of the housing 12 on opposite ends of the handle 57; a first receiving area 76 and a second receiving area 78. The first receiving area 76 is adapted to removably receive a first end 80 of the hose 18. The first end 80 of the hose 18 has a snap-lock latch with two deflectable cantilevered arms 82,83. The arms 82,83 have finger contact areas 84 and latch sections 86. The latch sections 86 engage notches 88 in the housing members 22,24 to prevent unintentional removal of the first end 80 of the hose 18. However, a user can press the two finger contact areas 84 towards each other to unlatch the latch sections 86 from inside the notches 88 and thereby allow removal of the first end 80 from the housing 12. When the first end 80 of the hose 18 is connected to the housing 12 a leading end 90 of the hose is located in one end of the coupling 44. An entrance of the bag 74 is attached to the opposite end of the coupling 44.

Figure 4E:
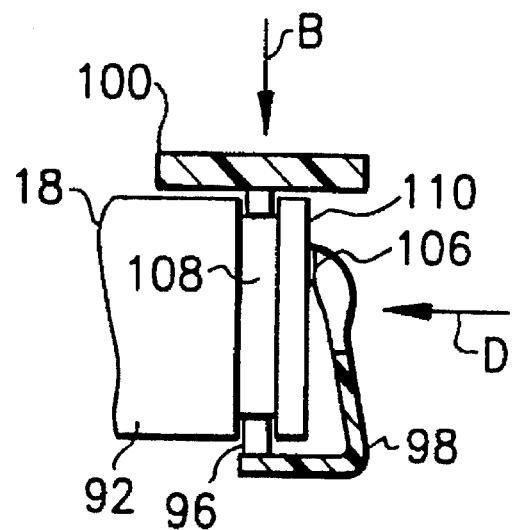
FIG. 4E is a schematic view of the connection of an end of the hose to a latch in the housing.
Figure 4A:
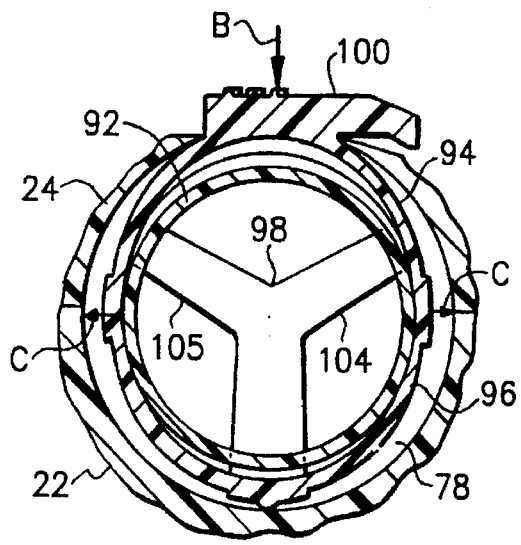
FIG. 4A is a partial cross sectional view of the apparatus shown in FIG. 1 taken along line 4A—4A.
Figure 4B:
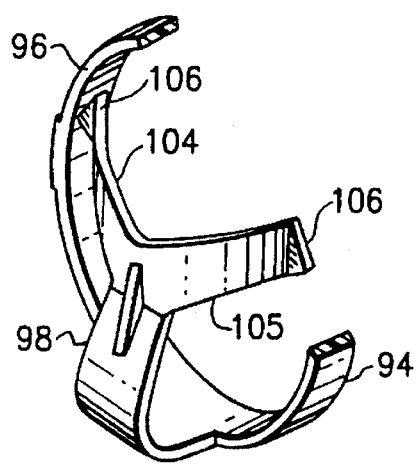
FIG. 4B is a perspective view with a partial cut away section of the latching member shown in FIG. 4A.
Figure 4C:
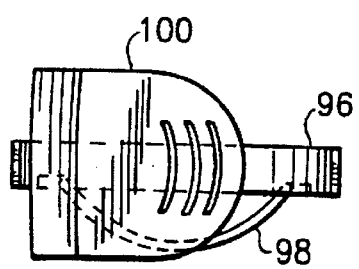
FIG. 4C is a plan top view of the latching member shown in FIG. 4B.
Figure 4D:
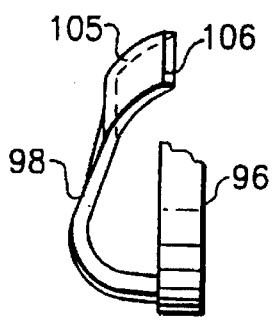
FIG. 4D is a side elevational view of the latching member shown in FIG. 4B with a partial cut away section.

The second receiving area 78 is provided for a second end 92 (see FIG. 2) of the hose 18. As seen in FIG. 4A, located in the second receiving area 78 is a latch member 94. Referring also to FIGS. 4B, 4C and 4D, in the embodiment shown the latch member 94 is a one-piece member made of a resilient plastic or polymer material. The latch member 94 has a first generally ring shaped section 96 and a second cantilevered arm section 98. The ring section 96 has a general oval shape with a button section 100 at its top. The button section 100 extends through an aperture 102 in the upper housing member 24 (see FIG. 1). The cantilevered arm section 98, in the embodiment shown, extends from the bottom of the ring section 96 and branches into two limbs 104,105 to form a general "Y" shape. The ends of the limbs 104,105 have contact areas 106 for contacting a leading edge of the second end 92 of the hose 18.

The latch member 94 is located in the second receiving area 78 with the cantilevered arm section 98 in the back of the area 78. Thus, when the second end 92 of the hose 18 is inserted into the area 78 it must first pass through the ring section 96 to contact the contact areas 106 of the cantilevered arm 98. Referring also to FIG. 4E, a schematic view of the second end 92 of the hose 18 is shown connected to the latch member, which is shown in cross-section. The second end 92 of the hose 18 has an annular recess or depression 108. As seen with reference to FIG. 4A, when the second end 92 is inserted into the ring section 96, the sides of the ring section spread apart and then snap back inwardly when they come into registry with the annular recess 108. This locks the second end 92 in the second receiving area 78. The second receiving area 78 thus forms a type of docking station for the second end 92. The contact surfaces 106 of the cantilevered arm 98 are located inside the ring section 96. As seen in FIG. 4E, when the second end 92 of the hose is inserted through the ring section 96 its leading edge 110 contacts the contact surfaces 106 and deflects the cantilevered arm 98 backwards. Because the two ends 80,92 of the hose 18 are both connected to the housing 12, the hose 18 is able to be retained at its storage position in the hose receiving area 54 along the side perimeter of the housing. In order to release the second end 92 of the hose a user presses down on button section 100 as indicated by arrow B in FIG. 4A. The sides of the ring section 96 spread apart as indicated by arrows C. This releases the locking engagement of the ring section 96 in the annular recess 108. At this point, with the locking engagement ended, the cantilevered arm 98 deflects back to its normal position and pushes the second end 92 in direction D shown in FIG. 4E. This ejects the second end 92, at least partially, to end registration between the annular recess 108 and the ring section 96. Thus, the latch member allows a one-handed disconnection of the second end 92 from the latch member 94 by merely pressing on the button section 100. A user does not need to use two hands to press on the button section and pull the second end 92 out of the area 78. In a preferred embodiment the cantilevered arm 98 is adapted to eject the second end 92 entirely out of the area 78. The latch member can be used in any suitable type of device; not merely vacuum cleaners. In addition, the latch member could be used to latch any suitable type of column shaped end of a member, with an annular recess, to another member. In another alternate embodiment, the latch member need not be provided in the vacuum cleaner 10.

Figure 5:
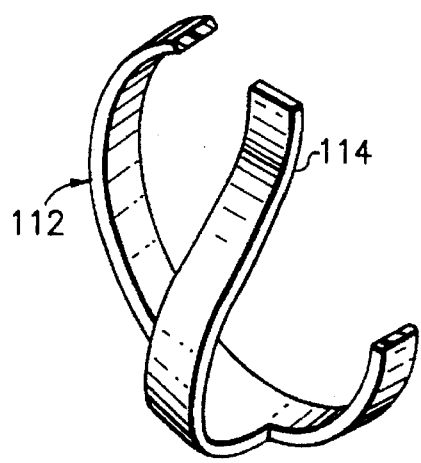
FIG. 5 is a perspective view of an alternate embodiment of a latching member shown with a partial cut away section.
Figure 6:
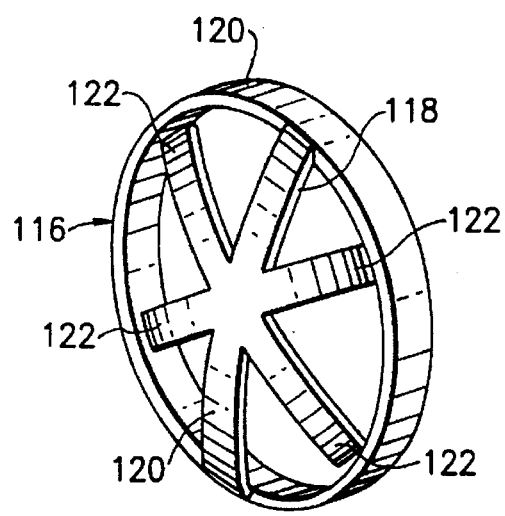
FIG. 6 is a perspective view of another alternate embodiment of a latching member.

Referring also to FIGS. 5 and 6, there are shown two alternate embodiments of a latching member. In the embodiment shown in FIG. 5, the latch member 112 has a cantilevered arm 114 that does not have branched limbs. In the embodiment shown in FIG. 6, the latch member 116 has a spring section 118 that is not cantilevered from the ring section 120. The spring section 118 has a span 120 that extends across the ring section 120. The span 120 has four cantilevered fingers 122. The fingers 122 have ends that are adapted to be contacted and deflected by the leading edge of the second end of the hose. In this embodiment the latch member 116 does not have a button section. The button section could be provided separately. The spring section could also be a separate member that is attached to the ring section, but in a preferred embodiment the ring section, spring section and button section are all part of a one-piece member. In alternate embodiments, other types of docking stations and latching members or mechanisms could be provided.

FIG. 1 also shows the hose 18 in its storage position on the housing 12. More specifically, the hose 18 extends around the side perimeter of the housing 12. As seen in FIG. 3, the hose 18 is located in the receiving area 54 and projects out of the receiving area 54. The hose extends partially out of the hose receiving area along substantially its entire length. The hose 18 thus forms the outer most portion of the apparatus 10 along about 75% of its circumference or side perimeter. This has been intentionally designed such that the hose 18, in its storage position, can function as a bumper for the apparatus 10. It also provides a compact and efficient storage area for the hose 18. In an alternate embodiment the area 54 could have a spiral shape to allow the hose to wrap around the housing more than once. The annular groove formed between the skirt 28 and the step 32 also provides an area to wrap an electrical cord (not shown) for storage purposes.

The apparatus 10 is specifically designed for use with animals, such as dogs and cats. This intended use presents unique problems not present with standard vacuum cleaners. Pets are often skittish of loud noises and things that are taller than them. The apparatus 10 has been designed to address these problems. More specifically, the height of the housing 12 is preferably only about 7 inches tall. It has been found that the width of the housing does not unduly frighten animals; it is the height that is important. Thus, the apparatus is configured to minimize the height by arranging the impeller parallel to the base with the bag 74 located above it. The noise produced by the apparatus has also been significantly reduced. In particular, as seen in FIG. 3, the apparatus 10 has a noise reduction system that includes two foam rings 130,132 that function as a muffler; both to noise from the motor 14 and noise from air flow. In addition to the rings 130,132, the air flow path of the air from the impeller 16 to the exit apertures 34 has been uniquely designed to reduce noise from the movement of the air. More specifically, as shown by air flow lines E, as the air exits the impeller 16 it is redirected 180° towards the motor 14. It is then redirected 90° to pass through the motor 14. This also acts to cool the motor. As the air exits the motor 14 it is redirected 90° in an outward radial direction. Because the areas A (see FIG. 3A) increase the further away from the motor 14, air velocity decreases. Reducing the velocity of the air before it exits the housing significantly reduces noise from exiting air. Thus, the apparatus 10 uses the arrangement of the impeller in the center and the air exit apertures radially spaced from the center to allow the air to be slowed down inside the housing before it exits the housing. This is done merely by providing an increasing cross-sectional air flow path as the air moves towards the exit apertures 34. The air is redirected two more times as it finally travels to the exit apertures 34 out of the housing 12. Because the air flow path redirects the air from the impeller five times at angles of 90° or more, air velocity noise is further reduced. The exiting air, as it exits the apertures 34, is directed downward so as not to be directed directly towards an animal being groomed. Because the apertures 34 extend around the entire perimeter of the housing 12, the majority of the exiting air will always be directed away from the animal being groomed. To further reduce noise the motor 14 is a brushless DC motor. In addition, the impeller 16 has fan blades 17 that have a length and curvature that extend along an arc of over 90° of the impeller 16. In a preferred embodiment the fan blades 17 have a length and curvature that extend along an arc of about 100°

In a conventional vacuum cleaner for cleaning floors, the vacuum generating system provides a suction or vacuum pressure of about 35 to 60 inches of water. The apparatus 10, because it is to be used on animals, has been specifically designed to provide a maximum vacuuming pressure of only about 10 to 12 inches of water. Vacuum pressure of 10 to 12 inches of water is generally equivalent to 693 to 832 feet of air, or 52 to 62.5 pounds per square foot, or 250 mm to 300 mm of water. Thus, the apparatus 10 has a suction that is only about one-half to one-third as strong as a conventional floor vacuum cleaner. This has been selected because the vacuum pull of the apparatus 10 is only intended to remove loose hair and debris; not to have a strong vacuum suction that would harm an animal or make the animal feel uncomfortable. Preferably, the sizes of the various components of the vacuum apparatus are selected to provide an air flow at the inlet to the hose of about 25 to 35 cfm (cubic feet per minute); such as with an inlet diameter of the second end 92 of about 1.3 inches. In a preferred embodiment the air flow rate is about 30 cfm. Volume of 25 to 35 cfm is generally equivalent to 0.75 to 1.05 $m^3$/min. (meters cubed per minute). It has been found that the combination of a large air flow (30 cfm) and low vacuum pressure (10 to 12 inches of water) provide superior results in grooming animals without making the animals nervous and skittish about being groomed. This combination of flow and vacuum pressure is unique to animal vacuum groom devices. In alternate embodiments slight changes with flow and vacuum pressure could be provided such as ±10 cfm and/or ±1 inch of water. Preferably, as seen in FIG. 2, attachments such as the brush 134 will be attached to the second end 92 of the hose 18 to help remove loose hair and debris. Thus, the attachment will contact the animal; not the inlet of the second end 92. Any suitable type of attachment could be used.

Another feature of the present invention is in regard to the control for the motor 14. The motor 14 is a variable speed motor. The actuator 64 (see FIG. 1) is slidably mounted to the housing 12. In an alternate embodiment, a rotatable knob could be used. Alternatively, any suitable type of controller could be used. The actuator 64 is movable between an OFF setting at marking 138 and a HIGH setting at marking 140. In order to set the speed of the motor to a high speed, the actuator 64 must be moved through lower speed settings before reaching the HIGH speed setting. This is provided to further prevent frightening an animal by allowing the user to gradually increase the speed of the motor. The variable speed motor 14 and variable controller 64 also allow the user to select a motor speed and vacuum setting dependent upon the type of animal being groomed. For example, a low setting could be selected for a puppy or kitten, and a high setting could be used for larger animals such as a full grown dog or cat. The user can also adjust the setting based upon the skittishness of the animal being groomed.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. An animal grooming vacuum apparatus comprising:

a housing;

a vacuum generating system located in the housing, the vacuum generating system including a motor and an impeller; and a hose connected to the housing wherein, the vacuum generating system, housing and hose are suitably configured to provide a vacuuming pressure at an inlet of the hose of only about 10 to 12 inches of water, said vacuum apparatus being suitably sized and shaped to provide a vacuum air flow of about 30 cfm such that animals can be groomed without harming the animals.

2. An apparatus as in claim 1 wherein the inlet of the hose has an air flow passage with a cross-sectional area of about 1.3 inches.

3. An apparatus as in claim 1 wherein the housing has a height of about seven inches.

4. An apparatus as in claim 1 wherein the housing has an exhaust air outlet that extends around substantially an entire side perimeter of the housing.

5. An apparatus as in claim 1 wherein the housing has a general circular disk shape.

6. An apparatus as in claim 5 wherein the housing has a hose receiving area around a majority of the side perimeter of the housing in which the hose is located.

7. In a vacuum apparatus having a housing, a motor, an impeller and a vacuum hose, the improvement comprising:
the housing having a hose receiving area around a majority of a side perimeter of the housing in which the hose is located, the hose extending partially out of the hose receiving area along substantially the entire length of said receiving area to form a bumper for the housing, opposite ends of the hose are removably connected to the housing, said housing having a handle located between the opposite ends of the hose when the opposite ends of the hose are connected to the housing.

* * * * *